UNITED STATES PATENT OFFICE.

SAMUEL DRUCKER AND WILLIAM SIECK, JR., OF CHICAGO, ILLINOIS.

PROCESS OF MAKING CATALYTIC MATERIAL.

1,375,368.      Specification of Letters Patent.     Patented Apr. 19, 1921.

No Drawing.     Application filed November 7, 1919. Serial No. 336,448.

*To all whom it may concern:*

Be it known that we, SAMUEL DRUCKER and WILLIAM SIECK, Jr., citizens of the United States, residing at Chicago, in the county of Cook and State of Illinois, have invented certain new and useful Improvements in Processes of Making Catalytic Material, of which the following is a specification.

This invention relates to the production of a nickel catalyst by the direct reduction of the chemically precipitated and purified nickel carbonate to which after its complete precipitation and washing an inert substance such as mica, talc, asbestos, graphite, kieselguhr, and the like has been added, in an atmosphere of pure hydrogen or hydrogen containing gases, and which is suitable for use in the process of hydrogenation of unsaturated animal or vegetable oils.

It is known that the production of catalysts by treatment of the chemically precipitated nickel carbonate either with or without a carrier or supporting medium such as pumice, asbestos, etc. has been accomplished. However, with the exception of the case where the carbonate is reduced in oil in the presence of hydrogen, the carbonate is first calcined to nickel oxid being reduced with hydrogen.

The present invention is based upon the discovery that a catalyst made from chemically precipitated nickel carbonate is most effective when the carbonate with which is mixed a substance which will prevent the sticking or sintering together of the carbonate particles is reduced directly in an atmosphere of hydrogen gas without an intermediate calcining of the carbonate. Thus, with the present invention, it is possible to combine the two operations into one, *i. e.*, the carbonate is automatically freed of its combined carbon dioxid gas and reduced with hydrogen in one operation and in the same vessel or apparatus.

The nickel carbonate is prepared in the usual manner by precipitating a soluble nickel salt with a soluble carbonate, such, for example, as sodium carbonate.

The resultant nickel carbonate is then thoroughly washed to remove all soluble salts. After the washing of the carbonate is completed, there is added an inert body such as powdered mica, talc, asbestos, graphite, kieselguhr, and the like. The further preparation of the catalyst is carried out by passing a current of hydrogen gas over the dried but not calcined mixture of the carbonate and inert body. For reduction the catalyzer is contained in a revolving drum or cylinder suitably heated. The catalyst may then be cooled in a current of hydrogen gas.

Sabatier, Senderens, and other investigators have found that the temperature at which the nickel oxid is reduced plays a very important role in the activity of the finished catalyst as well as in its sensitiveness to the so called catalyzer poisons. It has been found that the lower the temperature of reduction, within certain limits, the more active will be the finished catalyst. It has also been found that the most suitable temperature for the reduction of the nickel oxid in preparing catalysts depends considerably upon the temperature at which the corresponding nickel salt has been calcined. For example, with a higher temperature of calcination there would be necessary a higher reduction temperature and hence a less active catalyst.

The calcination requires considerable care and skill for the best results. It has been found that where over heating and the resultant sintering together of the particles in the calcining operation occurs, comparatively poor results are obtained from the finished catalyst, even though all of the subsequent operations have been performed with the best of skill and care.

From experiments made by the inventors, it has been found that unless the temperature of the calcination of the carbonate is held within very close limits, there is a tendency for the particles of the resulting nickel oxid to sinter or clinker together resulting in a loss of the porous structure and its ability to occlude hydrogen gas in the subsequent operation of reduction. The result is that the finished catalyst will contain a considerable amount of unreduced oxid and is not as active as is desired.

With the present invention, the porous or open structure of the nickel carbonate is preserved by mixing with the nickel carbonate after precipitation and washing, inert bodies such as powdered mica, talc, asbestos, graphite, kieselguhr, etc., as these substances are added to the carbonate after precipitation and washing the carbonate does not attach itself to or permeate the inert bodies or tend to cover them in layers or sheets, but the latter bodies act more as a separating medium and tend to keep the particles of carbonate from sticking together, thus making it possible for the hydrogen gas in the subsequent reduction to act upon all the surfaces of the carbonate, with the result that a complete reduction is obtained. The inert bodies mentioned do not in the present invention act as carriers such as would be the case when the inert body is present at the time that the nickel is being precipitated, and which it is understood has heretofore been done.

It is also known that the reduction of nickel carbonate in oil and in the presence of hydrogen has heretofore been accomplished. However, the catalyst made by this method is not always as active as may be desired, perhaps due to the fact that the oil has a tendency to enter the porosities of the carbonate and thus prevent the hydrogen from reaching all parts of the nickel carbonate.

The simple driving off of the combined carbon dioxid from the nickel carbonate takes place at a temperature of about 500° F. In the direct reduction of the nickel carbonate as accomplished with the present invention, the driving off of the carbon dioxid and the reduction of the oxid appear to take place almost simultaneously at this temperature. The reduction of the finished catalyst with the present method or process thereby practically becomes one operation and the temperature control is greatly simplified.

What is claimed as new is:—

1. The process of making a nickel catalyzer which consists in first precipitating nickel carbonate from an aqueous solution of nickel salt by means of a soluble carbonate, then washing the precipitate to remove all soluble salts, then adding a powdered inert non-reducible material, then drying the mixture without calcining, and finally reducing the dry mixture in an atmosphere of hydrogen.

2. The process of making a nickel catalyzer which consists in first precipitating nickel carbonate from an aqueous solution of nickel salt by means of a soluble carbonate, then washing the precipitate to remove all soluble salts, then adding talc, then drying the mixture without calcining, and finally reducing the dry mixture in an atmosphere of hydrogen.

In testimony whereof we have signed our names to this specification on this 5th day of November, A. D. 1919.

SAMUEL DRUCKER.
WILLIAM SIECK, Jr.